(12) United States Patent
Spreen et al.

(10) Patent No.: US 9,054,625 B2
(45) Date of Patent: Jun. 9, 2015

(54) VARIABLE SPEED DRIVE SYSTEM

(75) Inventors: James H. Spreen, Huntington, IN (US); Jonathan D. Northup, Fort Wayne, IN (US)

(73) Assignee: Franklin Electric Co., Inc., Fort Wayne, IN (US)

( * ) Notice: Subject to any disclaimer, the term of this patent is extended or adjusted under 35 U.S.C. 154(b) by 297 days.

(21) Appl. No.: 13/583,821

(22) PCT Filed: Mar. 11, 2011

(86) PCT No.: PCT/US2011/028226
§ 371 (c)(1),
(2), (4) Date: Sep. 10, 2012

(87) PCT Pub. No.: WO2011/113023
PCT Pub. Date: Sep. 15, 2011

(65) Prior Publication Data
US 2013/0002187 A1    Jan. 3, 2013

Related U.S. Application Data

(60) Provisional application No. 61/313,576, filed on Mar. 12, 2010.

(51) Int. Cl.
*H02P 23/00* (2006.01)

(52) U.S. Cl.
CPC .................................. *H02P 23/0077* (2013.01)

(58) Field of Classification Search
USPC .......................... 318/727, 767, 807, 810, 811
See application file for complete search history.

(56) References Cited

U.S. PATENT DOCUMENTS

| 4,117,364 | A | 9/1978 | Baker |
| 4,137,489 | A | 1/1979 | Lipo |
| 4,706,180 | A | 11/1987 | Wills |
| 5,285,144 | A | 2/1994 | Hsu et al. |
| 5,625,545 | A | 4/1997 | Hammond |
| 5,883,490 | A | 3/1999 | Moreira |
| 2003/0117815 | A1* | 6/2003 | Saada ............................ 363/40 |
| 2011/0043154 | A1* | 2/2011 | Hsu ............................... 318/503 |

OTHER PUBLICATIONS

Vaez-Zadeh et al., "High Average—Low Pulsating Torque Operation of Single Phase Induction Motors", IEEE. 2000, p. 1513-1518.
Kastha et al., On-Line Search Based Pulsating Torque Compensation of a Fault Mode Single-Phase Variable Frequency Induction Motor Drive, IEEE Transactions of Industry Applications, vol. 31, No. 4 Jul./Aug. 1995, p. 802-811.
International Preliminary Report on Patentability dated Jul. 5, 2012 in corresponding International Application No. PCT/US2011/28226.

* cited by examiner

*Primary Examiner* — Kawing Chan
(74) *Attorney, Agent, or Firm* — Faegre Baker Daniels LLP

(57) ABSTRACT

This disclosure relates to a variable speed drive for driving a single phase motor. The variable speed drive generates enhanced motor voltages including harmonic components configured to reduce torque pulsations.

19 Claims, 15 Drawing Sheets

VARIABLE SPEED DRIVE SYSTEM

CROSS-REFERENCE TO RELATED APPLICATIONS

This application is a National Stage application under 35 U.S.C. §371 of International Application No. PCT/US2011/028226 filed on Mar. 11, 2011, which claims the benefit of U.S. Provisional Patent Application Ser. No. 61/313,576 filed on Mar. 12, 2010, the disclosures of which are expressly incorporated by reference herein in their entirety.

FIELD OF THE DISCLOSURE

A system and method for driving a motor, and more particularly a system and method for controlling an operating characteristic of the motor.

BACKGROUND OF THE DISCLOSURE

Fluid supply systems use motors to drive pumps and transfer fluids from supply reservoirs, such as wells, to demand reservoirs, such as tanks. A sensor measures a characteristic of the fluid, and a controller controls operation of the motor. In some systems, the controller measures a level of the fluid in a tank and controls operation of the motor to maintain the level within a range. When the level reaches the low end of the range, the controller turns the motor on and keeps it on until the level reaches the high end of the range.

In other systems, the speed of the motor is controlled to maintain a fluid characteristic within predetermined parameters. Variable speed controls can gradually increase or decrease the pumping rate and thereby reduce the variability of the fluid characteristic. However, many single phase systems currently in operation were not designed to operate at a variable speed and may not be capable of doing so. In many instances, variable speed control of single phase motors magnifies the perceived acoustic noise generated by torque pulsations making it unacceptable to some users. While it is desirable to provide a variable speed system capable of operating with a variety of motors in new and retrofit applications, it is also desirable to reduce or eliminate torque pulsations resulting from variable speed operation of single phase motors. More generally, it is desirable to control motors to reduce the variability of system characteristics such as speed, torque, fluid pressure and noise.

SUMMARY OF THE DISCLOSURE

Exemplary embodiments of a system and a method for driving a single phase motor are disclosed herein. In some embodiments, the method is performed by a drive unit comprising an inverter providing a driving voltage to the single phase motor and a processing unit causing the inverter to provide the driving voltage.

In one embodiment according to the disclosure, a fluid supply system is provided comprising an inverter adapted to provide a driving voltage to a single phase motor and a processing unit generating a control voltage $V_{hew}(t)$ to cause the inverter to provide the driving voltage. The control voltage $V_{hew}(t)$ includes a fundamental component and an odd numbered harmonic component.

In one variation thereof, the fundamental component has a fundamental component magnitude and the harmonic component has a harmonic component magnitude which is smaller than the fundamental component magnitude. In one example, the control voltage $V_{hew}(t)$ has the form $V_{hew}(t)=f(\omega t)+A_i f(i\cdot\omega t+\theta_i)$, wherein i is an odd numbered integer, $A_i$ is the harmonic component magnitude and $\theta_i$ is a harmonic component phase shift. The harmonic component reduces torque pulsations of the motor. In another example, the control voltage $V_{hew}(t)$ further includes a second harmonic component which has a second harmonic component magnitude that is smaller than the harmonic component magnitude, the second harmonic component being odd numbered and phase shifted relative to the harmonic component. In a further example, the control voltage $V_{hew}(t)$ has the form $V_{hew}(t)=f(\omega t)+A_3 f(3\cdot\omega t+\theta_3)+A_j f(j\cdot\omega t+\theta_j)$, wherein $A_3$ is the harmonic component magnitude and $\theta_3$ is the harmonic component phase shift; wherein $A_j$ is the second harmonic component magnitude, $\theta_j$ is a second harmonic component phase shift, and wherein $A_3 > A_j$ and $\theta_j > \theta_3$. In yet another example, the functions $f(\omega t)$, $f(i\cdot\omega t+\theta_i)$ and $f(j\cdot\omega t+\theta_j)$ are selected from the group consisting of a sine function and a cosine function.

In another variation, the control voltage $V_{hew}(t)$ is configured to reduce a performance characteristic of the motor by at least about 10%, the performance characteristic selected from the group consisting of a torque ripple and a speed ripple, while achieving at least one of the following: maintaining a voltage crest factor of the driving voltage at or below about 1.4, maintaining a current crest factor of the driving voltage at or below about 1.9, and maintaining a total harmonic distortion of the driving voltage at or below about 50%. In one example, the control voltage $V_{hew}(t)$ is configured to maintain the voltage crest factor of the driving voltage at or below about 1.4 and the current crest factor of the driving voltage at or below about 1.9. As used herein, the term "reducing" means to decrease the value of the given parameter relative to the value the parameter would have without the injection of a harmonic component.

In a further variation, the single phase motor is drivingly coupled to a fluid pump to maintain a fluid pressure of a fluid therewith, wherein the control voltage $V_{hew}(t)$ reduces by at least about 10% a fluid pressure ripple of the fluid pressure.

In another variation thereof, the control voltage $V_{hew}(t)$ is configured to maintain a total harmonic distortion of the driving voltage at or below about 50%, and/or to maintain a voltage crest factor of the driving voltage at or below about 1.4, and/or to maintain a current crest factor of the driving voltage at or below about 1.9. In one example, the total harmonic distortion of the driving voltage is at or below about 50% and the voltage crest factor is at or below about 1.4. In another example, the total harmonic distortion of the driving voltage is at or below about 50% and the current crest factor is at or below about 1.9.

Any of the preceding variations of the present embodiment of the system can further include the single phase motor and the fluid pump. The foregoing improvements and reductions are not exclusive of other improvements and may be cumulative. For example, in one embodiment the voltage crest factor is maintained below about 1.4 while at the same time the current crest factor is maintained at or below about 1.9.

In a further variation thereof, the system further includes a skip frequency selection device operable to select a frequency. The processing unit is programmed to prevent operation of the single phase motor at frequencies based on the selected frequency. In one example, the selected frequency is selected based on a noise level of the system and is selected to abate the noise level.

An embodiment according to the disclosure of a method of operating a motor is also provided. The method includes generating a control voltage $V_{hew}(t)$ having the form $V_{hew}(t)=f(\omega t)+A_i f(i\cdot\omega t+\theta_i)$, where i is an odd numbered integer, $A_i$ is a harmonic component magnitude and $\theta_i$ is a harmonic component phase shift; generating a driving voltage with an inverter based on the control voltage $V_{hew}(t)$; and driving a single phase motor with the driving voltage to improve a performance characteristic.

In one variation thereof, the method includes the steps of: generating a control voltage $V_{hew}(t)$ having the form $V_{hew}(t)=f(\omega t)+A_i f(i \cdot \omega t+\theta_i)$, wherein i is an odd numbered integer, $A_i$ is a harmonic component magnitude and $\theta_i$ is a harmonic component phase shift; generating a driving voltage with an inverter based on the control voltage $V_{hew}(t)$; and driving a single phase motor with the driving voltage to improve a performance characteristic of the motor.

In another variation thereof, the control voltage $V_{hew}(t)$ further includes a second harmonic component having a second harmonic component magnitude and a second harmonic component phase shift, the control voltage $V_{hew}(t)$ having the form $V_{hew}(t)=f(\omega t)+A_i f(i \cdot \omega t+\theta_i)+A_j f(j \cdot \omega t+\theta_j)$, wherein j is an odd numbered integer, $A_j$ is the second harmonic component magnitude and $\theta_j$ is the second harmonic component phase shift, and wherein $A_i > A_j$ and $\theta_j > \theta_i$.

In a further variation, improving the performance characteristic includes reducing at least one of a torque ripple and a speed ripple of the motor by at least about 10%.

In a yet further variation, the improving the performance characteristic is achieved while meeting at least one of the following: maintaining a voltage crest factor of the driving voltage at or below about 1.4; maintaining a current crest factor of the driving voltage at or below about 1.9; and maintaining a total harmonic distortion of the driving voltage at or below about 50%.

In still another variation, improving the performance characteristic includes reducing an acoustic noise related to the operation of the motor by at least about 10%. In a further variation improving the performance characteristic includes reducing a fluid pressure ripple of a fluid pressure generated with a pump driven by the motor by at least about 10%.

The foregoing embodiments and many of the attendant advantages of this invention will become more readily appreciated as the same become better understood by reference to the following detailed description when taken in conjunction with the accompanying drawings.

Figure 1:
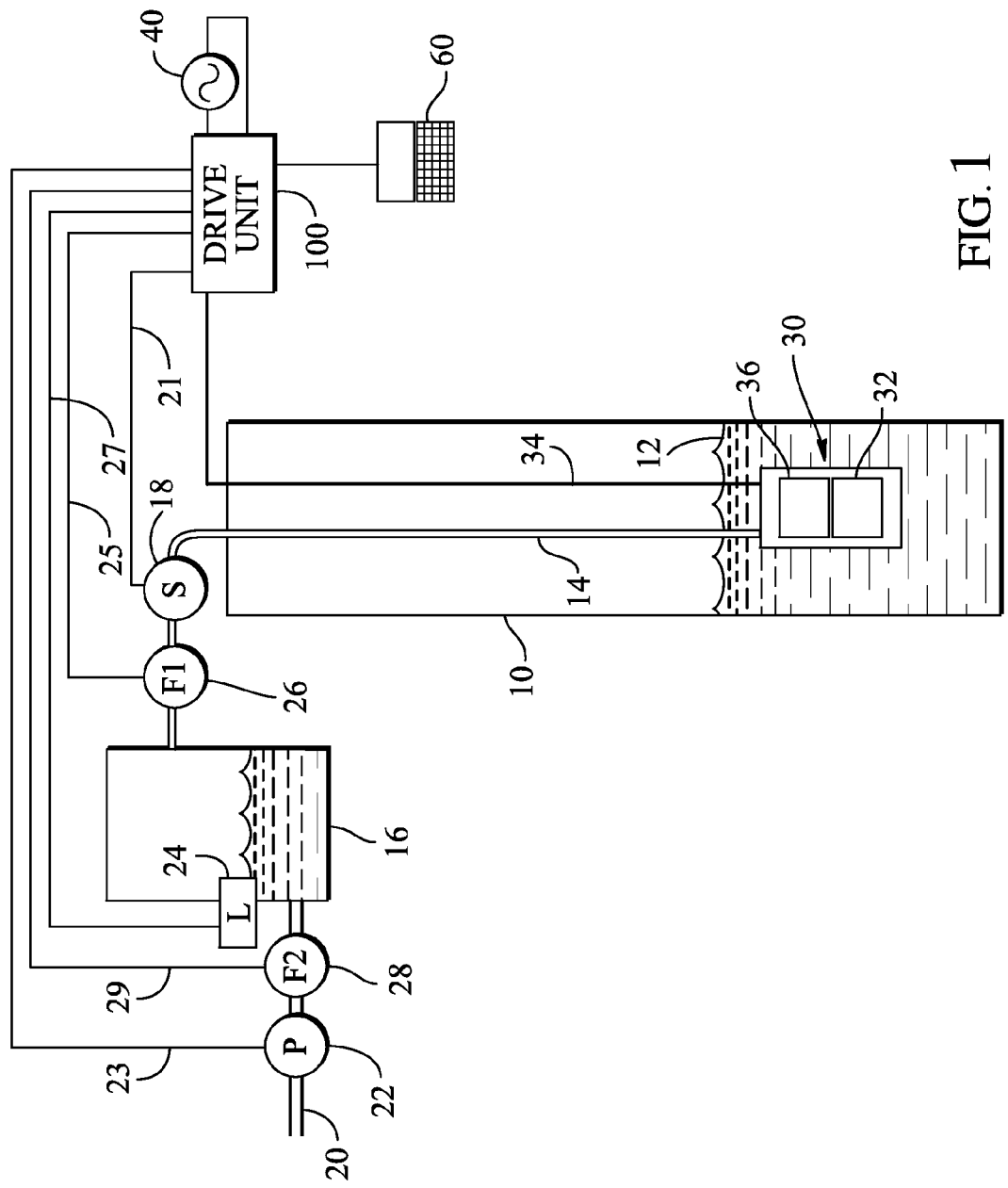
FIG. 1 is a block diagram of an exemplary liquid supply system according to one embodiment of the disclosure.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention.

The exemplification set out herein illustrates embodiments of the invention, and such exemplifications are not to be construed as limiting the scope of the invention in any manner. As used herein, the terms "comprising" and "including" denote an open transition meaning that the claim in which the open transition is used is not limited to the elements following the transitional term.

DETAILED DESCRIPTION

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the disclosure is thereby intended. The invention includes any alterations and further modifications in the illustrated devices and described methods and further applications of the principles of the invention which would normally occur to one skilled in the art to which the invention relates.

The invention disclosed herein relates to improved methods and systems for driving single phase motors and loads. For any electrical load on a single phase power supply, the instantaneous electrical input power is not constant, as in a balanced multi-phase system, but always becomes zero at least twice within each cycle. With a motor as a load, the instantaneous single phase electrical power to the motor becomes negative for part of each cycle, so it passes through zero four times in each cycle of the input voltage. The mechanical power out of a motor is the speed times the torque. The motor's speed is nearly constant, having only small variation about a constant value. The instantaneous output power, tracking the input power, passes through zero and becomes negative when the torque becomes negative. The zero crossings cause power variations, which may be referred to herein as power ripple, and corresponding torque pulsations that are periodic and can have frequencies which are multiples of the frequency of the motor input voltage and current.

Torque pulsations in a single phase motor may increase vibration, especially if the frequency of the torque pulsations excite a mechanical resonance of the overall structure. For a single phase motor powering a water pump, the torque pulsations produce speed variations in the pump, which produce pressure pulsations in the water, which in turn produce acoustic noise which may be unacceptable to an end user. A water pumping system may operate using a single phase motor with an internal start switch, submerged in the well with the pump. Only two power connections are available at the top of the well, so such an arrangement may be labeled a "two-wire" or 2 W system. It is also possible to have three power connections at the top of the well—one from a common point between the main and start windings, and one from each end of the two windings—this arrangement may be labeled a "three-wire" or 3 W system.

Single phase motors and their environment can be designed to reduce torque pulsations. However, when single phase motors are used in variable speed applications, traditional noise suppression techniques designed to function at line voltage frequency are unsatisfactory. Furthermore, while individuals may, over time, become insensitive to acoustic noise, individuals are typically sensitive to acoustic noise when it varies. In some embodiments disclosed herein, advantageous features are provided to reduce torque pulsations without reductions in average torque. The features may be implemented to reduce acoustic noise in fluid supply systems, and, more generally, are applicable to any single phase system to reduce the undesirable effects of torque pulsations.

In one embodiment according to the disclosure, a fluid supply system is provided comprising an inverter adapted to provide a driving voltage to a single phase motor and a processing unit generating a control voltage $V_{hew}(t)$ to cause the inverter to provide the driving voltage. The control voltage $V_{hew}(t)$ includes a fundamental component and an odd numbered harmonic component. The control voltage is provided to a pulse-width-modulated (PWM) controller which generates the appropriate gating signals to convert direct current (DC) voltage into an alternating current (AC) voltage suitable to drive the motor and referred to herein as the driving voltage.

In one variation thereof, the fundamental component has a fundamental component magnitude and the harmonic component has a harmonic component magnitude which is smaller than the fundamental component magnitude. In one example, the control voltage $V_{hew}(t)$ has the form $V_{hew}(t)=f(\omega t)+A_i f(i \cdot \omega t+\theta_i)$, wherein i is an odd numbered integer, $A_i$ is the harmonic component magnitude and $\theta_i$ is a harmonic component phase shift. The harmonic component is injected to reduce torque pulsations of the motor. In another example, the control voltage $V_{hew}(t)$ further includes a second harmonic component which has a second harmonic component magnitude that is smaller than the harmonic component magnitude, the second harmonic component being odd numbered and phase shifted relative to the harmonic component. As used herein, the terms "harmonic component" and "second harmonic component" represent additions to the control voltage irrespective of which harmonic frequency is being added. Thus, the harmonic component or the second harmonic component could comprise the third, fifth, seventh etc. harmonic frequency.

In a further example, the control voltage $V_{hew}(t)$ has the form $V_{hew}(t)=f(\omega t)+A_3 f(3 \cdot \omega t+\theta_3)+A_j f(j \cdot \omega t+\theta_j)$, wherein $A_3$ is the harmonic component magnitude and $\theta_3$ is the harmonic component phase shift; wherein $A_j$ is the second harmonic component magnitude, $\theta_j$ is a second harmonic component phase shift, and wherein $A_3>A_j$ and $\theta_j>\theta_3$. In yet another example, the functions $f(\omega t)$, $f(i \cdot \omega t+\theta_i)$ and $f(j \cdot \omega t+\theta_j)$ are selected from the group consisting of a sine function and a cosine function.

In another variation, the control voltage $V_{hew}(t)$ is configured to reduce a performance characteristic of the motor by at least about 10%, the performance characteristic selected from the group consisting of a torque ripple and a speed ripple, without up-sizing the drive. In a further variation, the single phase motor is drivingly coupled to a fluid pump to maintain a fluid pressure of a fluid therewith, and the control voltage $V_{hew}(t)$ reduces by at least about 10% a fluid pressure ripple of the fluid pressure. The fluid may be water pumped by the fluid pump from a reservoir and maintained at a constant supply pressure within a dwelling. Pressure ripples can generate undesirable noise which is reduced when ripple is reduced. Torque ripple can be measured with sensors sensing instantaneous force or pressure applied by the motor to a load, in a manner analogous to the measurement of speed ripple described further below.

In a further variation thereof, the system further includes a skip frequency selection device operable to select a frequency. The processing unit is programmed to prevent operation of the single phase motor at frequencies based on the selected frequency. In one example, the selected frequency is selected based on a noise level of the system and is selected to abate the noise level. The skip frequency function can be manual or automatic. If manual, a user selects a frequency and the drive unit skips related frequencies. If automatic, a sensor detects a performance characteristic and select a suitable skip frequency to improve the performance characteristic.

An embodiment according to the disclosure of a method of operating a motor is also provided. The method includes generating a control voltage $V_{hew}(t)$ having the form $V_{hew}(t)=f(\omega t)+A_i f(i \cdot \omega t+\theta_i)$, where i is an odd numbered integer, $A_i$ is a harmonic component magnitude and $\theta_i$ is a harmonic component phase shift; generating a driving voltage with an inverter based on the control voltage $V_{hew}(t)$; and driving a single phase motor with the driving voltage to improve a performance characteristic.

In one variation thereof, the method includes the steps of: generating a control voltage Vhew(t) having the form $V_{hew}(t)=f(\omega t)+A_i f(i \cdot \omega t+\theta_i)$, wherein i is an odd numbered integer, $A_i$ is a harmonic component magnitude and $\theta_i$ is a harmonic component phase shift; generating a driving voltage with an inverter based on the control voltage $V_{hew}(t)$; and driving a single phase motor with the driving voltage to improve a performance characteristic of the motor.

In another variation thereof, the control voltage $V_{hew}(t)$ further includes a second harmonic component having a second harmonic component magnitude and a second harmonic component phase shift, the control voltage $V_{hew}(t)$ having the form $V_{hew}(t)=f(\omega t)+A_i f(i \cdot \omega t+\theta_i)+A_j f(j \cdot \omega t+\theta_j)$, wherein j is an odd numbered integer, $A_j$ is the second harmonic component magnitude and $\theta_j$ is the second harmonic component phase shift, and wherein $A_i>A_j$ and $\theta_j>\theta_i$.

In a further variation, improving the performance characteristic includes reducing at least one of a torque ripple and a speed ripple of the motor by at least 10%.

In a yet further variation, the improving the performance characteristic is achieved while meeting at least one of the following: maintaining a voltage crest factor of the driving voltage at or below about 1.4; maintaining a current crest factor of the driving voltage at or below about 1.9; and maintaining a total harmonic distortion of the driving voltage at or below about 50%.

In still another variation, improving the performance characteristic includes reducing an acoustic noise related to the operation of the motor by at least about 10%. In a further variation improving the performance characteristic includes reducing a fluid pressure ripple of a fluid pressure generated with a pump driven by the motor by at least about 10%.

The foregoing exemplary embodiments of the disclosure will now be described with reference to the figures. Referring to FIG. 1, a diagrammatic representation of a liquid supply system is disclosed. The liquid supply system comprises a reservoir 10 containing a liquid 12 which is pumped by a pump unit 30 through a conduit 14 into a reservoir 16. Pump unit 30 includes a pump 36 driven by a motor 32 which is powered by a drive unit 100 by a connector 34. In one embodiment, reservoir 10 is a deep-well. Motor 32 may be a conventional single phase induction motor and pump 36 may be a conventional centrifugal pump. Connector 34 may comprise two or three wires to provide single phase power to motor 32 which may comprise a 2 W or 3 W motor. A conventional one-way check valve (not shown) may be provided between pump 36 and reservoir 16 to prevent backflow of liquid 12.

During operation of the system, liquid 12 flows out of conduit 20. Fluid characteristics including liquid level, flow rate differential, and pressure may be monitored by a sensor 24, flow sensors 26, 28 and a pressure sensor 22 disposed in reservoir 16, conduit 14, and conduit 20, respectively. Corresponding measurement signals are provided through lines 23, 25, 27 and 29 to drive unit 100. While any number of fluid characteristics may be measured to provide feedback to drive unit 100, the exemplary system described herein may function with a single sensor or with multiple sensors. Furthermore, a noise or vibration sensor may be provided and signals from the sensor transmitted through a line 21 to drive unit 100. An exemplary vibration sensor 18 coupled to conduit 14 is shown in FIG. 1. Sensor 18 senses vibrations of conduit 14 as fluid 12 is pumped therethrough by pump unit 30. Also, an input device may be provided. An exemplary input device 60 is shown. One example of the operation of the vibration sensor and the input device is described below with reference to a skip frequency feature configured to abate noise and/or vibrations. Advantageously, multiple sensors may be used to provide redundancy and detect system malfunctions such as leaks, obstructions and malfunctioning sensors, valves and other devices typically used with liquid supply systems. Alternatively, other fluid sensors may be positioned in reservoir 16 or in any other location where a characteristic of the supply liquid useful to calculate a desired pumping rate may be measured. Reservoir 10 may be an aboveground or underground tank, a well casing, or any other reservoir containing liquid 12. Reservoir 16 may be an underground or aboveground tank, or any other liquid containment device.

Drive unit 100 comprises electronic components for determining a value of the fluid characteristic, comparing the value to target parameters, and providing variable power to motor 32 to control the fluid so that an actual value of the fluid characteristic matches the target. Put differently, drive unit 100 reduces a gap between the actual and target values of the fluid characteristic by controlling the speed of motor 32. The comparing and providing steps may be carried out by a central processing unit (CPU) capable of executing processing instructions, by a logic circuit, or by a hybrid system that processes instructions and also comprises logic circuits. The CPU may receive inputs from the fluid sensors directly or may receive signals scaled and conditioned by electronic circuits that are well known in the art of sensing and measuring fluid characteristics. The CPU may also receive user inputs corresponding to the desired fluid parameters and user inputs for programming various operating schedules. Drive unit 100 may comprise any well known hardware and software interface required to input the parameters including touch-screen displays, keyboards, mouse, speech-recognition systems and any other input and output interface. Alternatively, drive unit 100 may function as a motor controller and receive a speed reference signal from a system controller in which case it maintains a desired speed indicated by the speed reference signal.

Figure 2:
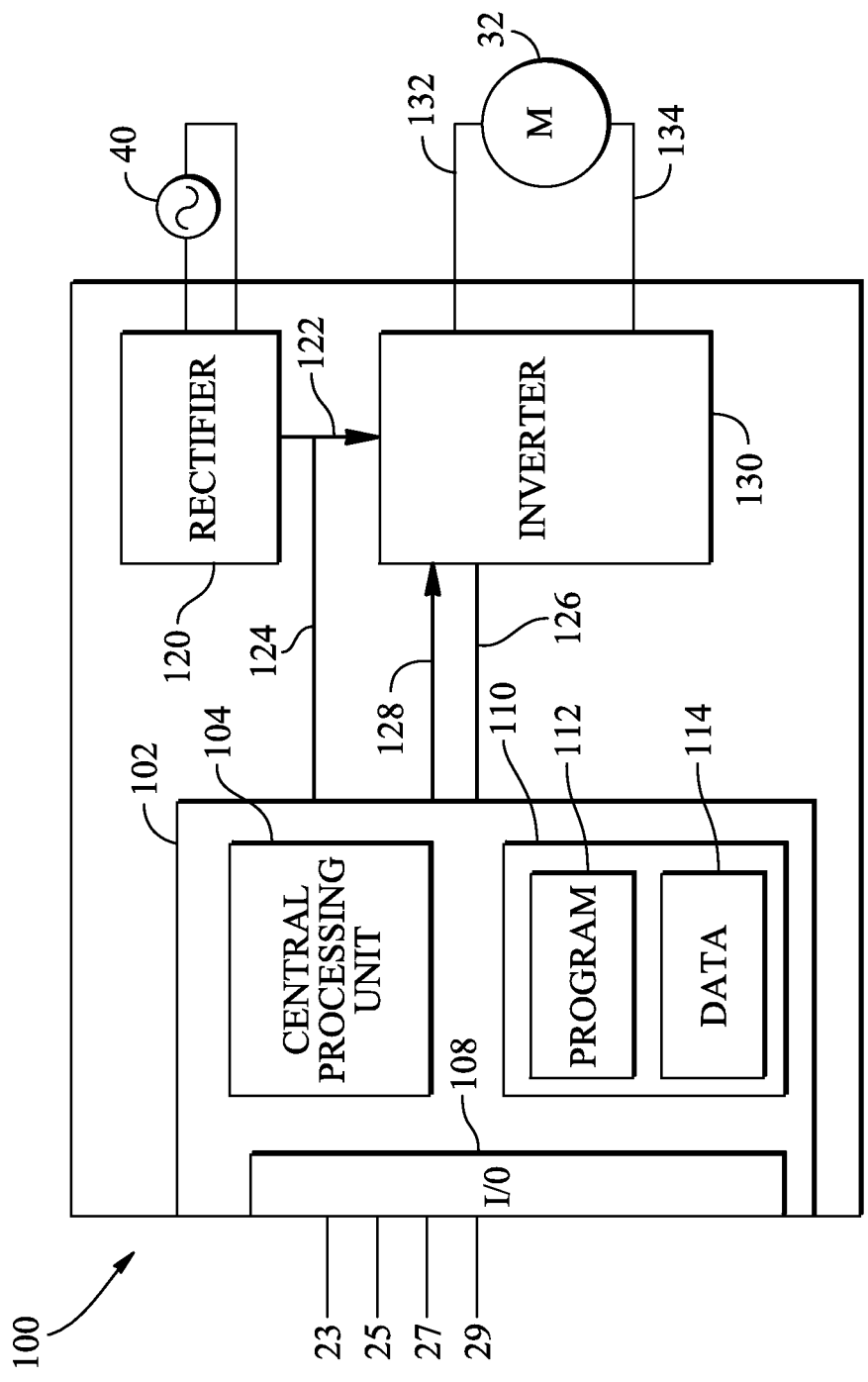
FIG. 2 is a block diagram of an exemplary drive unit for controlling the liquid supply system of FIG. 1.

FIG. 2 illustrates an exemplary embodiment of drive unit 100 comprising a processing unit 102, a rectifier 120 and an inverter 130. As shown, processing unit 102 includes a CPU 104 configured to access a memory 110 and execute processing instructions from a program 112 based on data 114. For example, memory may be provided in a separate integrated circuit such as a FPGA or EEPROM. The FPGA may also be used to store processing sequences and to configure the I/O interface, for example. CPU 104 receives inputs through an I/O interface 108 and outputs a control voltage 128 to inverter 130. A dedicated logic circuit may also output a reference signal which a processing unit can use to calculate control voltage 128. Rectifier 120 is powered by a power source 40. Inverter 130 receives DC current from rectifier 120 through a conductor 122 and has power switches that convert the DC power to variable motor input power having a fundamental component and a harmonic component configured to reduce torque and/or speed ripple, and, in a fluid supply system, fluid pressure ripple and accompanying noise. Current drawn by inverter 130 from rectifier 120 is sensed by a current sensor (not shown) and a current signal is provided to CPU 104 by conductor 124. Motor voltage feedback can also be provided, for example through conductor 126 connecting inverter 130 and processing unit 102. Current and voltage feedback may be applied by processing unit 102 to characterize power signals and implement the features disclosed below. The functionality of drive unit 100 may also be achieved with other drive topologies.

Traditional drives vary the fundamental frequency of the motor input voltage, which has a sinusoidal waveform, to control the speed of the motor. Drive unit 100 reshapes the traditional sinusoidal waveform to produce "squarer" motor input power. The modification is accomplished by injecting harmonic components to the sinusoidal voltage waveform to produce fundamental and harmonic currents in the motor which, advantageously, can be designed to reduce ripple. It may be desirable to accommodate a range of electrical loads with both resistive and reactive parts, over a range of frequencies, with one waveform modification. In addition, it may be desirable to reshape the motor voltage or current to limit the possibility of adding excessive loss or other undesirable effects in either the inverter or the motor, which generally are designed assuming sine wave operation. Finally, it is desirable to avoid requiring excessive peak voltage or current, which would not only require expensive inverter capability but may also require a voltage booster for the dc link providing voltage to the inverter switches. Advantageously, the reshaping method achieves these desirable features resulting in a more effective overall system which does not require over-sizing the inverter or the motor to accommodate waveform reshaping. The cumulative reshaping effect may be characterized by a total harmonic distortion (THD) value and a crest factor (CF) value. The range of THD and CF that can be achieved by reshaping the wave allows acceptable trade-offs to be accomplished for each application.

A resistive load was mathematically modeled to illuminate the principles of the disclosure. As explained further below, the results obtained by modeling a resistive load are analogous to the results expected from a model including an inductive load. The analogy is based on mathematical similarity: torque in an induction motor is proportional to a product of winding currents, and the power in a resistor is proportional to the square of its current. For modeling consider a resistor R=2 ohms with current i(t) flowing through it. The instantaneous power dissipated in the resistor is $p(t)=i^2(t)R$. For sine wave current, $i(t)=1.0$ amp $\cos(\omega t)$, 1 ampere peak at radian frequency $\omega$, causes power dissipation $p(t)=2$ watt $\cos 2 (\omega t)=2$ watt (½) $[1+\cos(2\omega t)]=1$ watt+1 watt $\cos (2\omega t)$. The resistor thus has 1 watt of average power dissipation, with a 1 watt peak ripple at $2\omega$, twice the frequency of the current.

If a second term at frequency $3\omega$ is added to the current, then a cross term resulting from squaring the current introduces another contribution to the power at $2\omega$. With the added term, the current is $$i(t)=1.0 \text{ ampere } \cos(\omega t)+B\cos(3\omega t+\phi),$$

where B is a coefficient in amps and $\phi$ is a phase shift.

Figure 3:
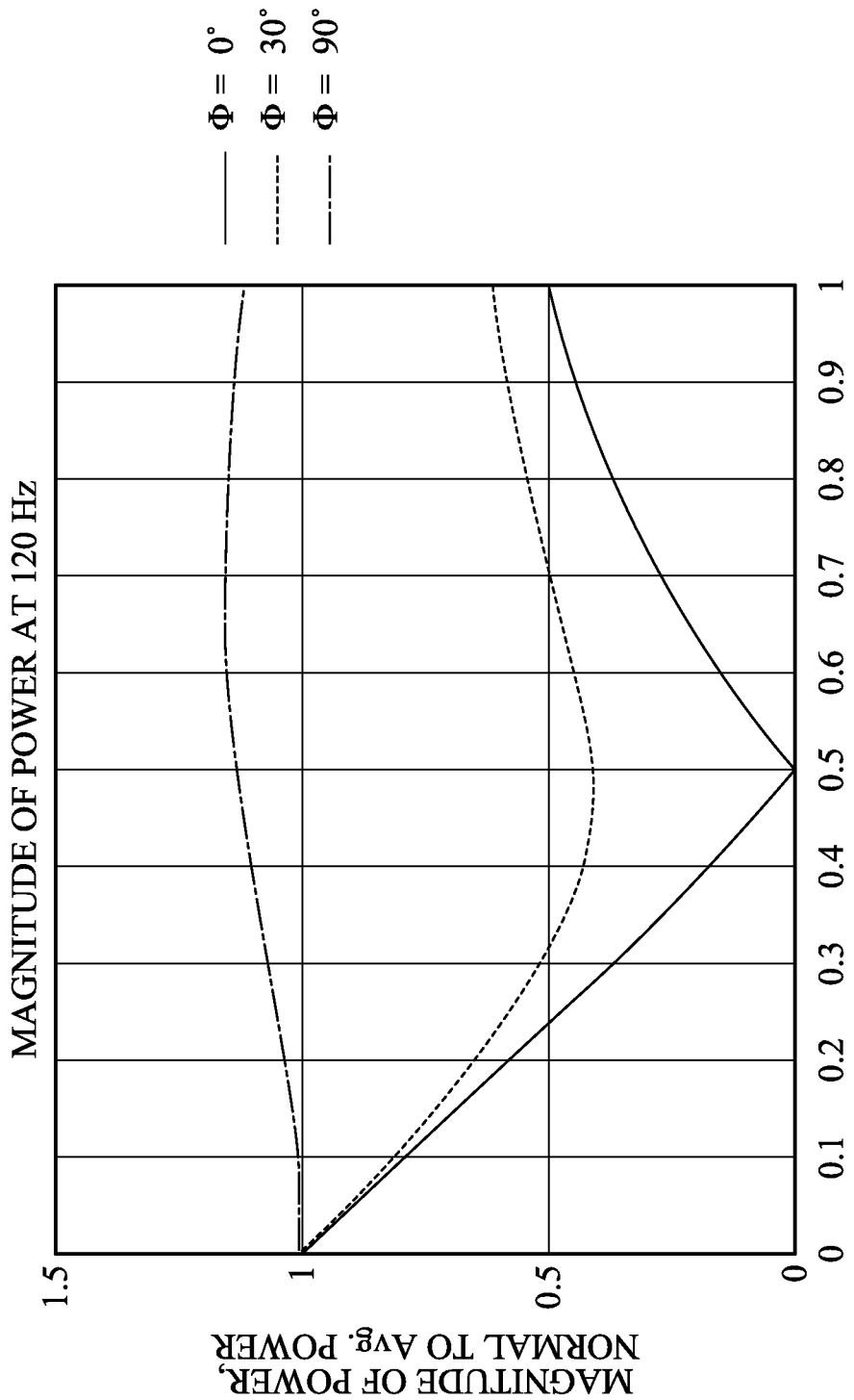
FIGS. 3 to 7 are graphs of modeled voltage characteristics of a resistive load to illustrate theoretical principles of the disclosure.

The amplitude B and phase $\phi$ of the $3\omega$ current component can be selected so that the second term at $2\omega$ in the power exactly cancels the first. FIG. 3 shows some possibilities calculated for the case of 60 Hz current. The three curves show the magnitude of the 120 Hz power ripple, as a function of the coefficient B of i(t), for phase shifts $\phi$ of 0 degrees, 30 degrees and 90 degrees. Note that B=0.5, $\phi$=0 degrees produces exact cancellation of the 120 Hz ripple.

Figure 4:
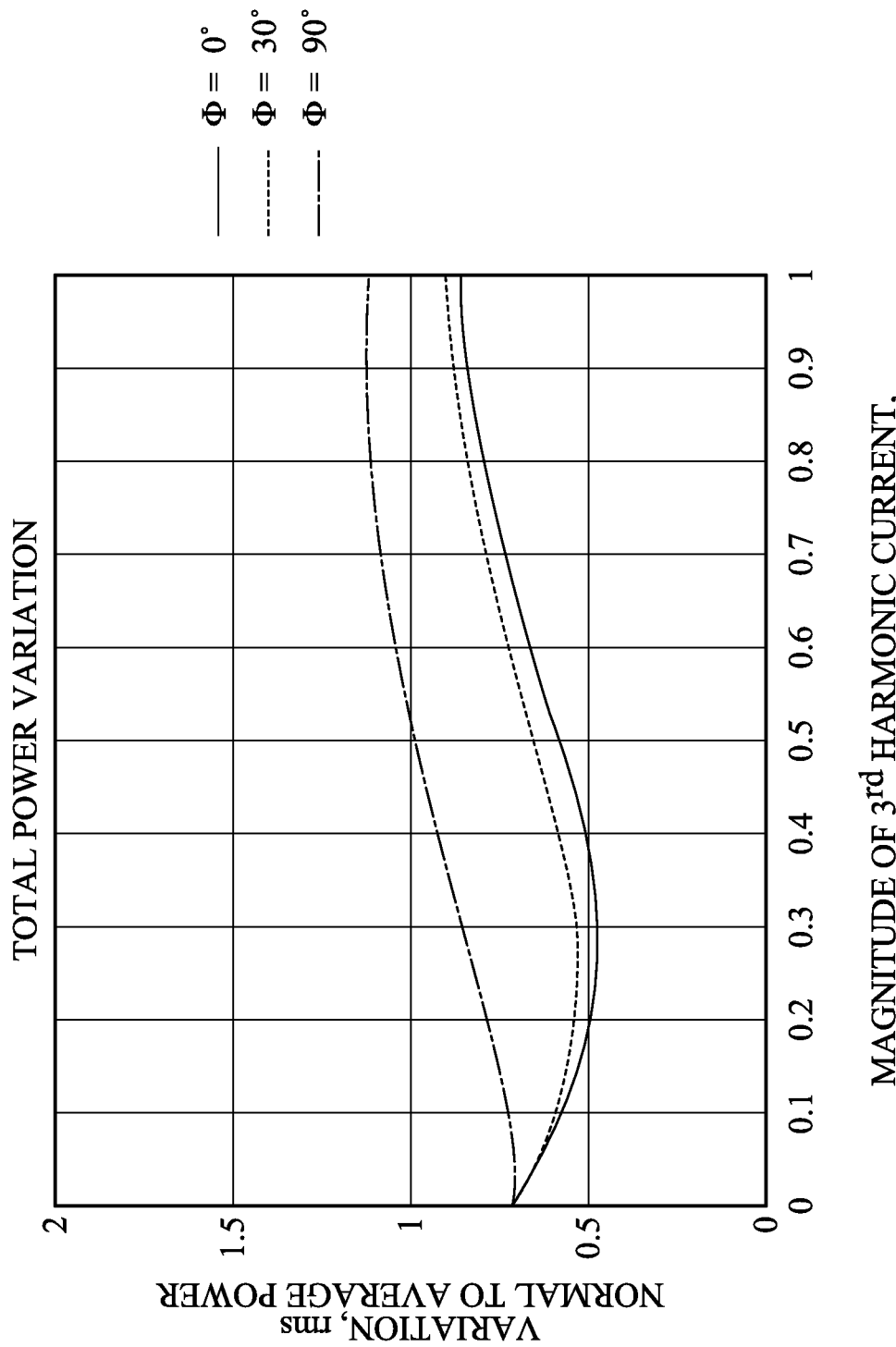

Since the ripple exists at multiple frequencies (120, 240, and 360 Hz), it cannot be described by a single amplitude. Thus, while 120 Hz ripple can be reduced to zero, as shown in FIG. 3, significant ripple remains at higher frequencies. One measure of this ripple is an AC rms value, i.e., the root mean square value of the waveform after the average (DC) value has been removed. FIG. 4 illustrates how this value of the ripple can be expected to behave. The three curves correspond to φ=0 degrees, 30 degrees and 90 degrees. Since the rms value of a cosine with amplitude 1 is 0.707, all three curves start at 0.707 for B=0, as expected from the sine wave case derived above. Interestingly, there is no combination of magnitude B and phase φ of the 3ω current component that produces zero rms ripple. The minimum rms ripple does not occur sharply at the value of B (=0.5) that produces exact cancellation of the 120 Hz ripple but occurs broadly near B=0.3.

Figure 5:
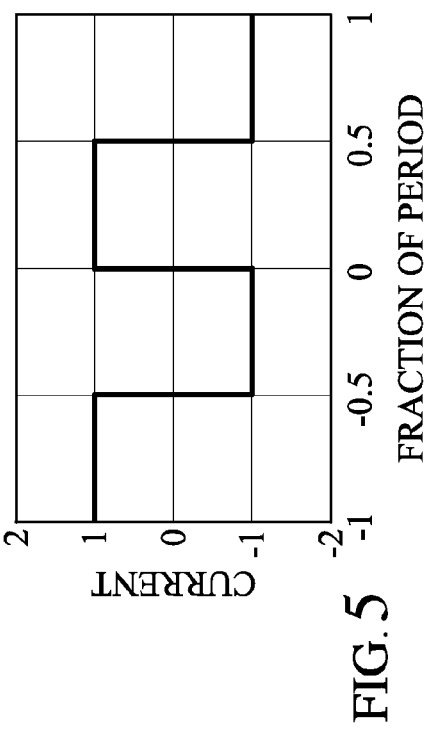
Figure 6:
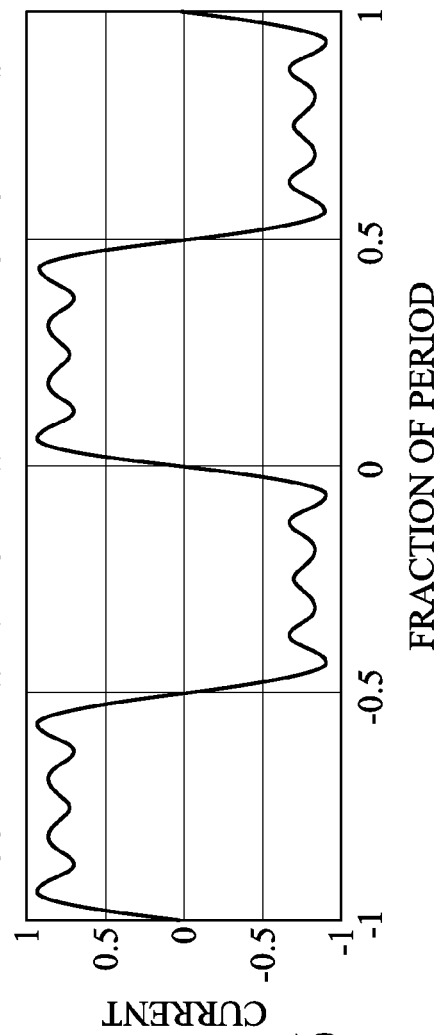
Figure 7:
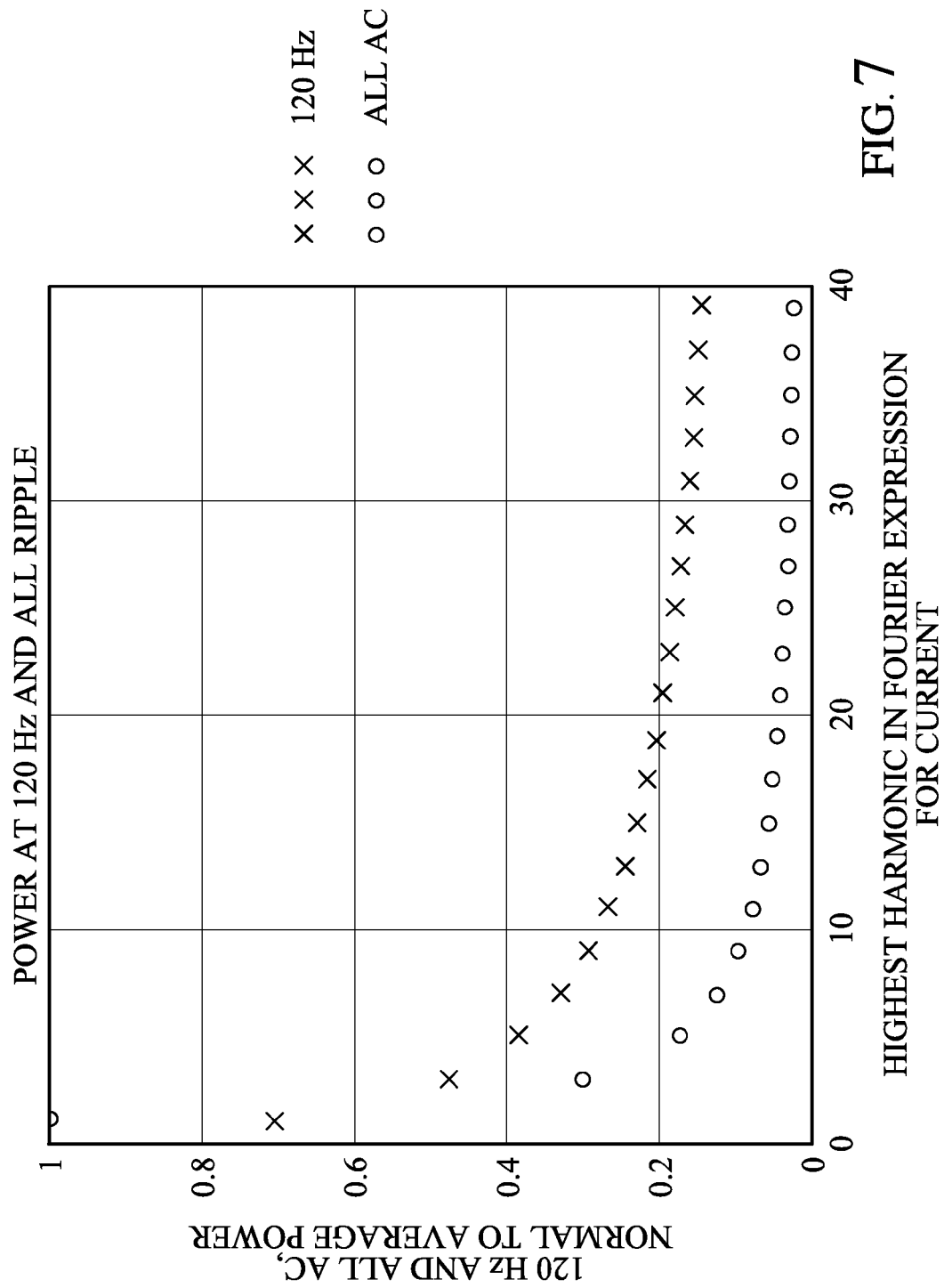

Returning to the resistive load power calculations, consider the ideal case of a square wave current as shown in FIG. 5. The square of the waveform is a constant value, 1, the instantaneous power p(t)=2 watts, independent of time, and no ripple occurs. This ideal waveform can be approximated by a finite number of terms of a Fourier sum that, in the mathematical limit of an infinite number of terms, equals a square wave. This Fourier sum requires only odd numbered harmonics and the magnitudes decrease with increasing frequency. FIG. 6 shows a current waveform constructed from the first four terms in a Fourier sum for a square wave, illustrating the reshaping towards a square wave that occurs with a small number of components. The benefit in terms of overall ripple reduction occurs with few components. FIG. 7 shows calculated ripple values as a function the highest number of harmonics included to reshape the waveform. Both the 120 Hz component and the AC rms values approach zero as the waveform approaches the mathematical limit of an ideal square wave. Reshaping of the input waveform to move toward an ideal constant power input reduces both the 120 Hz ripple and the AC rms ripple. In this resistor analogy, more than 50% ripple reduction can be obtained by including up to the 9th harmonic (only four terms added to the fundamental, since only odd harmonics are needed).

In contrast to the resistive load used in the illustration, an induction motor presents a complex electrical load, with inductive and resistive components, to a drive. In addition, the electrical load varies with mechanical load. Advantageously, the wave reshaping approach enables selection of a single set of number, magnitude, and phase of harmonic components that can provide significant ripple reduction under varying conditions and loads. Of course, a system may be configured to have more or fewer Fourier components and may also be tailored with a plurality of sets of number, magnitude and phase of harmonic components. In one embodiment, two sets are provided corresponding to a start-up mode of operation and a run-mode of operation. The start-up set may correspond to a motor having a starting capacitor, for example, where the run set corresponds to operation of the motor after the starting capacitor drops off.

The principles described above with reference to a purely resistive load were verified according to the following tests and simulations. To compare motor voltages and variability, drive unit 100 was provided with data 114 comprising two look-up tables. One look-up table comprised data to generate a driving voltage at conductors 132 and 134. The second look-up table comprised data to generate an enhanced driving voltage at conductors 132 and 134, the enhancement being the injection of a harmonic voltage component. Each look-up table was read by CPU 104 at periodic time intervals and scaled in magnitude to correspond to a desired output voltage and operating frequency. In an additional configuration, a third look-up table was used to test a second enhanced voltage. The two enhanced voltage look-up tables comprise enhanced waveforms (hew1 and hew2), enhanced by the injection of third and fifth harmonic components normalized to unity fundamental for convenience. Hew1, expressed below in formula (1), provided more torque variation reduction than hew2 but required larger voltage and current peaks.

$$\text{hew1}(t) = \sin(\omega t) + 0.30 \sin(3\omega t + 40°) + 0.20 \sin(5\omega t + 50°) \quad (1)$$

$$\text{hew2}(t) = \sin(\omega t) + 0.16 \sin(3\omega t + 25°) + 0.10 \sin(5\omega t + 35°) \quad (2)$$

The harmonic parameters of magnitude, phase, degree and number of harmonic components will differ depending on the drive, motor and load constraints. However, waveforms constructed to satisfy the practical trade-offs between peak voltage and current concerns over a frequency range are enabled by the present embodiment. It should be noted that while the enhanced voltage is shown in formulas (1) and (2) with sine components, there are many mathematically equivalent constructs (e.g. cosine waveform with different phase, time-shifted sine and cosine waveforms, etc.) and those will achieve the same results. In other words, it is the addition of odd harmonic components that matters and the use of the sine function in the exemplary embodiments should not be construed to limit the scope of the invention.

Figure 8:
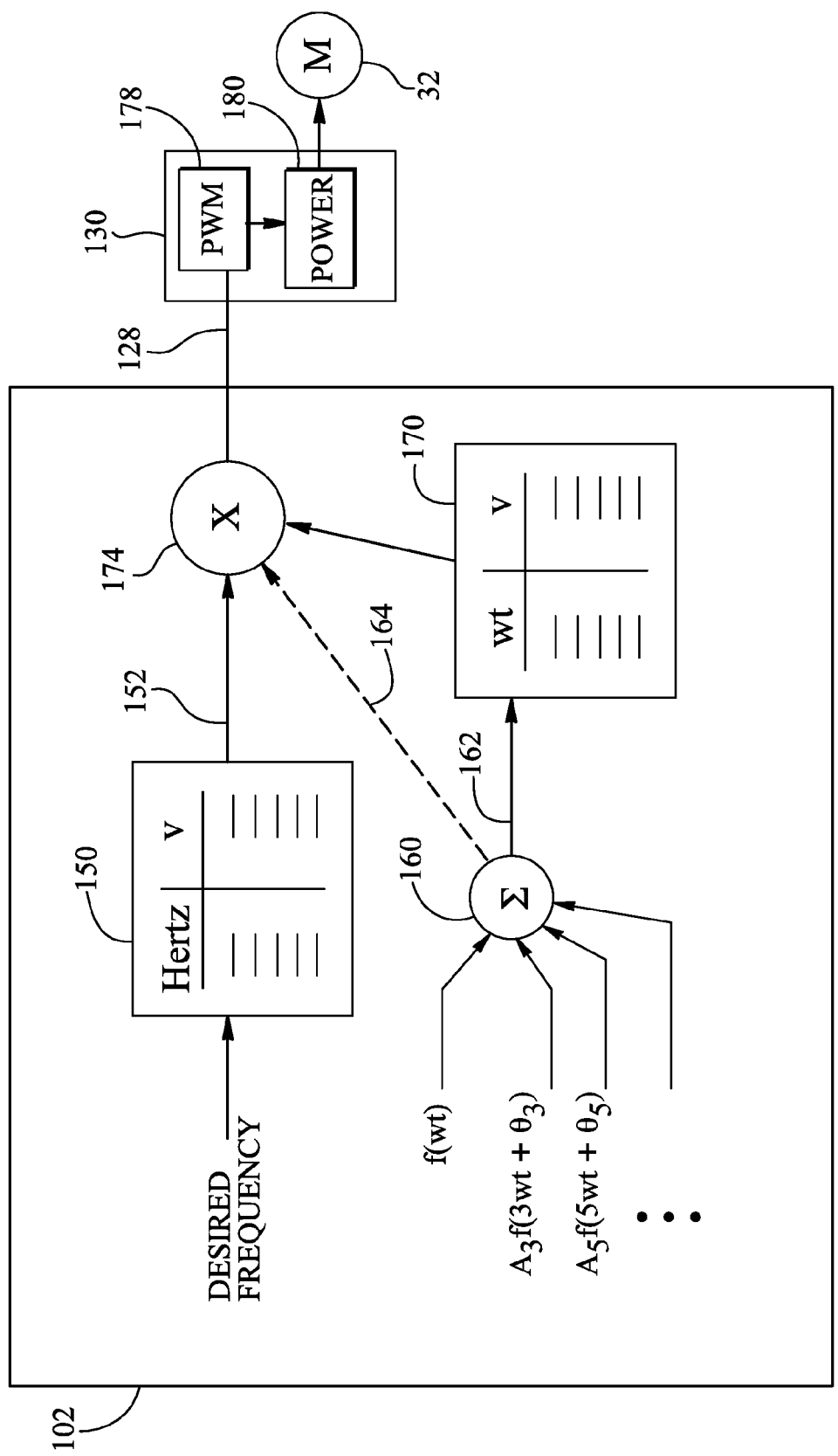
FIG. 8 is a diagrammatic representation of the functionality of the drive unit of FIG. 2.

FIG. 8 is a diagrammatic representation of the functionality of drive unit 102. Shown therein are drive unit 102 commanding inverter 130 via control signal 128 to operate according to the parameters defined in a volts-hertz table 150 and a summing function 160. Control signal 128 provides a conventional PWM controller 178 a multitude of voltage values which in combination generate a desired voltage curve. PWM controller 178 produces switching signals in a conventional manner to turn on and off power switches 180 to drive motor 30. Volts-hertz table 150 is a conventional volts-hertz table containing values of voltages $V_f$ corresponding to frequencies spanning the operating range of the motor. Lines 152, 162 and 164 represent communication of volts values to an arithmetic function 174 which combines the volts values provided by table 150 with volts values produced from summing function 160 or a table 170. Summing function 160 and arithmetic function 174 may be implemented in hardware, software or a combination of hardware and software. Upon selection of a desired enhanced voltage scheme, a plurality of functions including the fundamental component $f(\omega t)$ and at least one odd numbered harmonic component, e.g. $A_3 f(3\omega t+\theta_3)$, $A_5 f(5\omega t+\theta_5)$ etc., are added by summing function 160 and output as $V_{hew}(t)$. $A_i$ represents the magnitude of the harmonic component, $\theta_i$ represents the phase shift of the harmonic component, and i takes on a value selected from the group including 3, 5, 7, 9 and other odd integer values. The magnitudes are scaled to unity for convenience. In one form thereof, $V_{hew}(t)$ is communicated via line 164 to arithmetic function 174 where it is multiplied by $V_f$ to produce a control voltage $V_c$. In another form thereof, values of $V_{hew}(t)$ corresponding to ¼, ½ or a full wave are initially stored in table 170 and, during operation, communicated to arithmetic function 174 to produce control voltage $V_c$. Drive unit 102 is programmed to read and scale the ¼ and ½ scaled values to generate a full wave. As discussed above, the harmonic functions can be sine waves, cosine waves, or any other equivalent trigonometric function.

Figure 9:
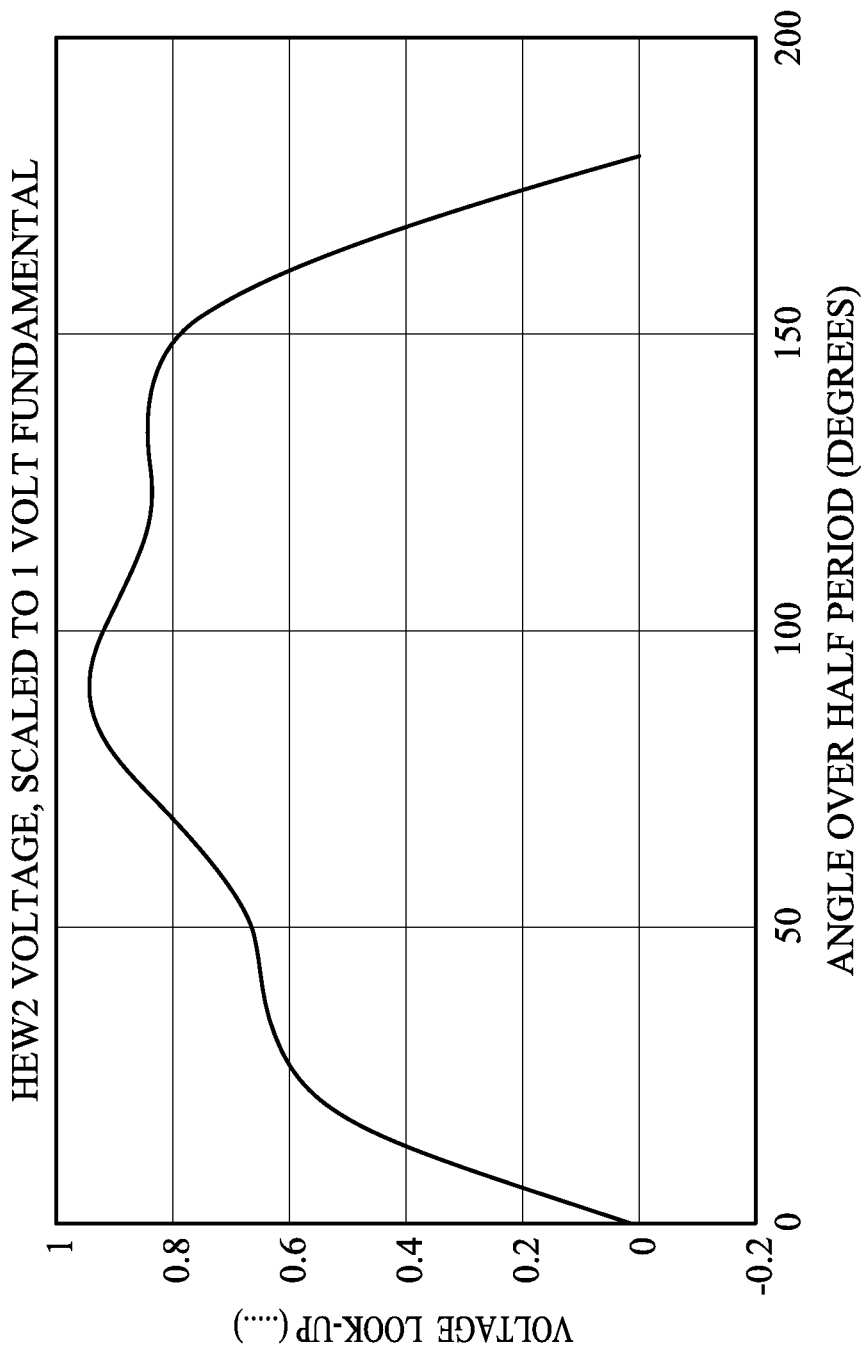
FIG. 9 is a graph of a scaled enhanced motor voltage curve generated with a drive unit according to the disclosure.

FIG. 9 is a graph of voltage waveform hew2(t). Formula (2) was applied at periodic time intervals within one-half sine-wave to generate values for a hew2 look-up table. The values are all positive integers, normalized to 255 for the largest value. The structural definition of the waveform is thus flexible, to be scaled in volts and time as required at different operating points of the drive. The hew2 look-up table was then read in sequence to generate the values graphed in FIG. 9. The hew2 look-up table was subsequently used in a test loop to quantify speed and pressure ripple, or variability, improvements graphically depicted in FIGS. 10 to 12. The test loop included a drive implementing the hew2 look-up table to power a 1 HP 230 volts single phase motor, Franklin Electric model #2445086110, driving a 1 HP 25 gpm, 6-stage centrifugal pump, FPS 4400 model 25FA1S4-PE, to pump water up a pipe having a pressure gage to measure average pressure, a transducer to measure pressure variation, a flow transducer and a valve. The valve was adjusted to vary fluid pressure in the pipe. The motor and pump are available from Franklin Electric Co., Inc., Bluffton, Ind.

Figure 10:
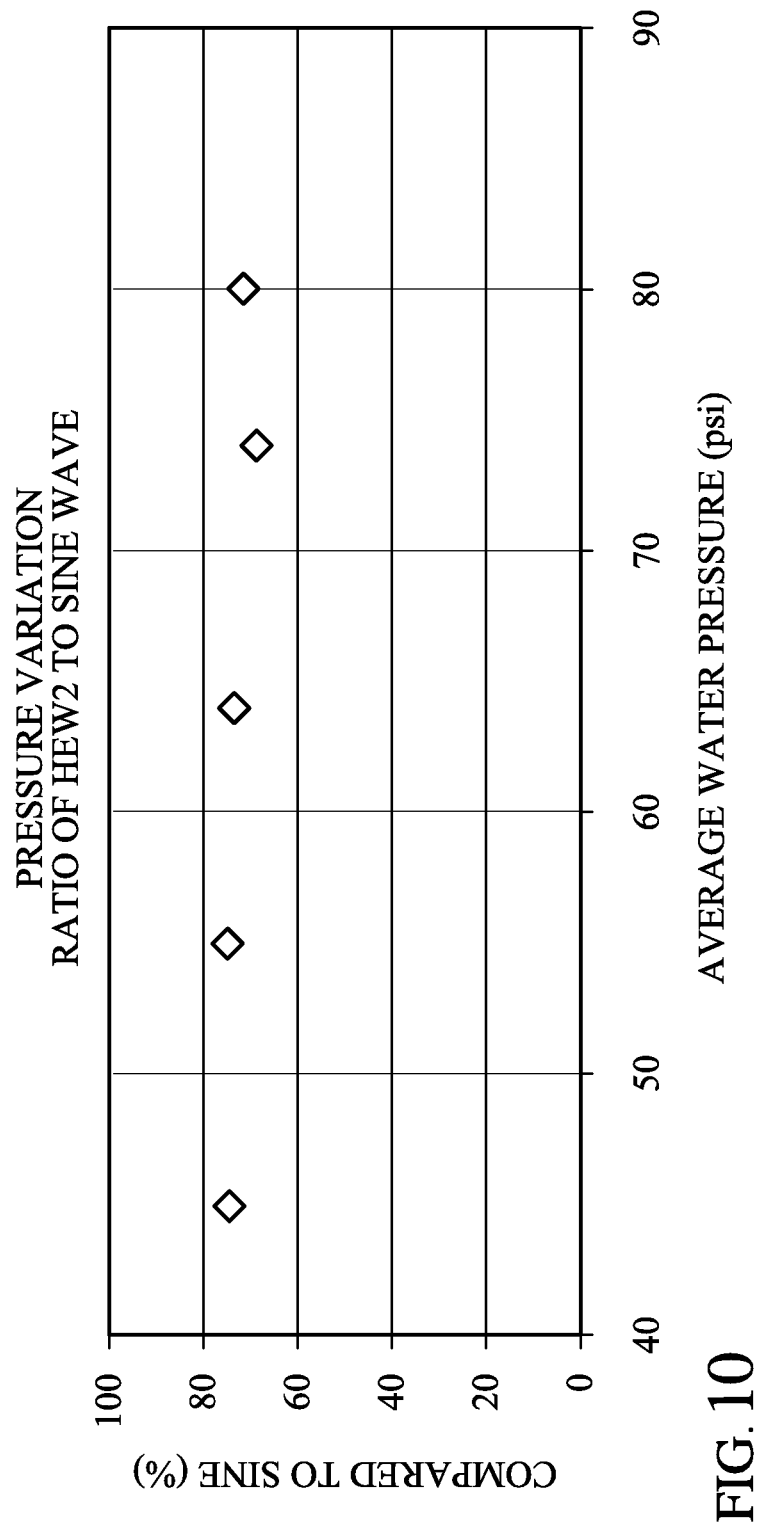
FIGS. 10 to 15 are graphs depicting enhanced characteristics obtained by reshaping a motor input voltage with a drive unit according to the disclosure.

FIG. 10 is a graph illustrating the effect on pressure variation of driving the pump with sinusoidal voltage and enhanced hew2 voltage. The ratio of the pressure variation obtained with the sinusoidal and enhanced voltages were plotted as a function of average pressure obtained from the pressure gage. The frequencies were set at 57.6 Hz. The ratios shown in FIG. 9 range from 68.7 to 74.35 demonstrating that hew2 voltage reduces pressure variation in the test loop by at least 25% compared to the sinusoidal voltage substantially independently of flow and average pressure. It is expected that even with different motor and drive combinations the application of an enhanced waveform will reduce pressure variation 15% or more.

Figure 11:
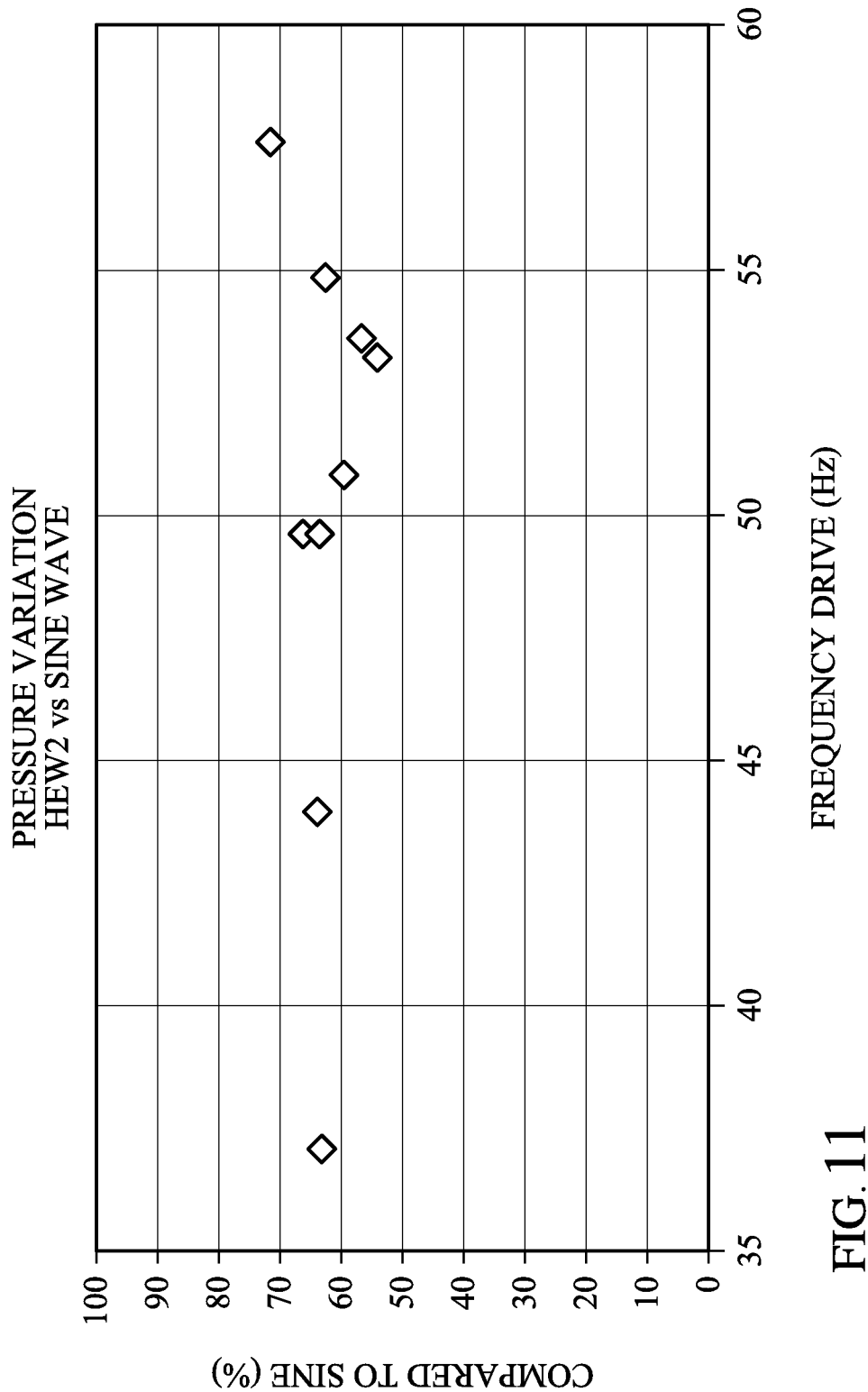

FIG. 11 is a graph illustrating the effect of fundamental frequency on pressure variation. As in FIG. 9, the effect is expressed as the ratio of the pressure variation obtained with the sinusoidal and enhanced voltages. The graph shows that hew2 voltage reduces pressure variation by at least 30% at most frequencies compared to the sinusoidal voltage substantially independently of driving frequency. The best result was obtained at 53.2 Hz where the ratio was 0.54 which equates to a 46% variation reduction. FIG. 10 also shows the effect of mechanical resonance between 50 and 60 Hz. During testing, a pronounced acoustic noise was discernible in that range of frequencies. Hew2 voltage noticeably and significantly reduced the acoustic noise and palpable vibration in the pipe.

In another exemplary embodiment of the disclosure, a "skip frequency" function is implemented to cause the drive to avoid selected frequencies. The skip frequency function may be implemented independently or together with waveform reshaping. In one variation thereof, the drive unit is provided with a selection device such as a hardware pushbutton, a software button object in a graphical user interface (GUI), and any other input device which a user can activate to select a frequency or frequency range to be avoided. In another variation thereof, the drive is provided with sensors and a program to automatically detect a higher than normal noise or vibration level and to automatically avoid noisy frequencies, which may be referred to as those frequencies generating higher than normal noise or vibration levels.

In one example, the drive comprises with a setup algorithm to identify a skip frequency range based on two frequencies. The two frequencies are identified with user input or automatically using sensors. In a manual identification process, the setup algorithm gradually increments the frequency of the pumping system to enable the user to listen for acoustic noise and detect mechanical resonance. When the user notices increased acoustic noise he/she activates the selection device described above, and when the increased acoustic noise decreases again he/she activates the selection device again. The range of frequencies between the selected frequencies is thereafter skipped by the drive. In an automatic identification process, a sensor such as a microphone, accelerometer, strain gage or any other sensor capable of sensing movement or vibrations provides information to the drive from which the drive will detect the skip frequency range. The drive may implement statistical functions such as moving averages, three-sigma limits and other mathematical algorithms to detect significant changes in sensor input values and, thus, to identify the two frequencies that define the skip frequency range. In another example, the user selects a frequency in the manner described above and an algorithm identifies a skip frequency range having predefined frequency band based on the selected frequency. In one example, the selected frequency is the center frequency of the frequency band. In another example, the selected frequency can be the smallest or the largest frequency of the frequency band.

Two additional factors can be used to quantify the extent to which any reshaping either deviates from a sine wave or requires excessive peak voltage or current capability: total harmonic distortion (THD) of the waveform and crest factor (CF). Specifically, consider a general periodic current i(t) with fundamental frequency $f_0$ and general harmonic content, represented by the mathematical expression $$i(t) = \sum_{n=1}^{\infty} I_n \cos(n 2\pi f_0 t + \phi_n)$$

Any DC component of the current has been removed (mathematically, it could be represented by a term with n=0). The fundamental component is the term with n=1. The root-mean-square (rms) value of each harmonic is defined as $$Irms_n = \sqrt{\frac{1}{2} I_n^2}$$

in which the factor of ½ appears because of the mean (average over time) of each cosine-squared. The rms value of a total current with harmonics is $$Irms = \sqrt{\sum_{n=1}^{\infty} Irms_n^2}$$

Then a total harmonic distortion (THD) factor can be defined as $$THD = \sqrt{\frac{\sum_{n=1}^{\infty} Irms_n^2}{Irms_1^2} - 1}$$

Values of THD are frequently presented as percentages. A low THD indicates a waveform close to a pure sine wave, with reduced risk of additional high-frequency heating in the motor, for example. Identical expressions can be applied to voltage waveforms. If there are no harmonics, ($I_n$=0 for n>1) then THD=0. Adding a set of harmonics that produces a THD less than 50% to reshape the waveform can significantly reduce torque pulsations in a single phase motor. The hew2 voltage has a THD of approximately 20%. In contrast to the present invention, torque ripple cancellation methods useful to continue operation of three-phase motors under an open-phase fault condition require current with a THD of at least 100%.

Although THD provides a measure of the harmonic content, it provides little information on the peak current or voltage, since the phase relationships among harmonics is not considered in THD. The crest factor can provide peak current or voltage information. Continuing to use the current expressions, above, the crest factor is defined as $$CF = \frac{I_{peak}}{I_{rms}}$$

Again, a corresponding expression can be used to define CF for voltage. A lower CF indicates that the same rms value ("resistive heating capability") of a waveform can be delivered with lower peak values of the waveform. In general, then, a lower CF reduces peak voltage and current stresses on components. However, CF values too low indicate that the waveform must contain harmonics, which may increase risk of high-frequency heating, as mentioned above with reference to THD.

If there are no harmonics, ($I_n$=0 for n>1) then CF=$\sqrt{(2)}$≈1.4. Based on measurements and simulations, hew2 voltage has a CF of approximately 1.3 (less than a pure sine wave), and the resulting motor currents have CF in the range of 1.6-1.9. In contrast, the exact cancellation of 120 Hz ripple, as described above for a three-phase motor open-phase fault operation, requires a voltage waveform with a CF over 1.5 and a current CF over 1.9.

As shown above, adding harmonics to reshape the motor voltage provides significant improvements in torque pulsation reductions with acceptable deviation from a sinusoidal waveform to minimize various concerns described above. In addition, reshaping enables an opportunity to reduce the voltage CF below 1.4 while maintaining current CF below 1.9. Of course, CF values can also be higher. Accordingly, in one embodiment the harmonic components are selected to satisfy competing goals with voltage and current THD values below 50% over a broad operating frequency range. In another embodiment, the harmonics are selected to maintain THD values below 50% while maintaining voltage CF below 1.4 and current CF below 1.9. In a further embodiment, the harmonics are selected to maintain THD values below 50% and torque pulsations are further reduced by causing the drive to skip a range of frequencies corresponding to higher than normal noise levels. Normal noise levels are those experienced over the majority of the frequency range while higher than normal noise levels are levels detectable by sensors or by a user to be different than normal noise levels. The drive may implement statistical functions such as moving averages, three-sigma limits and other mathematical algorithms to detect statistically significant changes in sensor input values and, thus, to identify higher than normal noise levels.

Measurements of variation in both motor speed and water pressure in the test loop were made to quantify vibration/noise amplitude. Each of these measurements quantified a small variation or ripple about a much larger average value. The measurement method ensured that only those variations in synchronism with electrical input power contributed to the value. Thus, any pressure variation due to mechanical operation of the pump, which would occur synchronized with the rotor speed, not the electrical frequency, would be averaged to zero.

Figure 12:
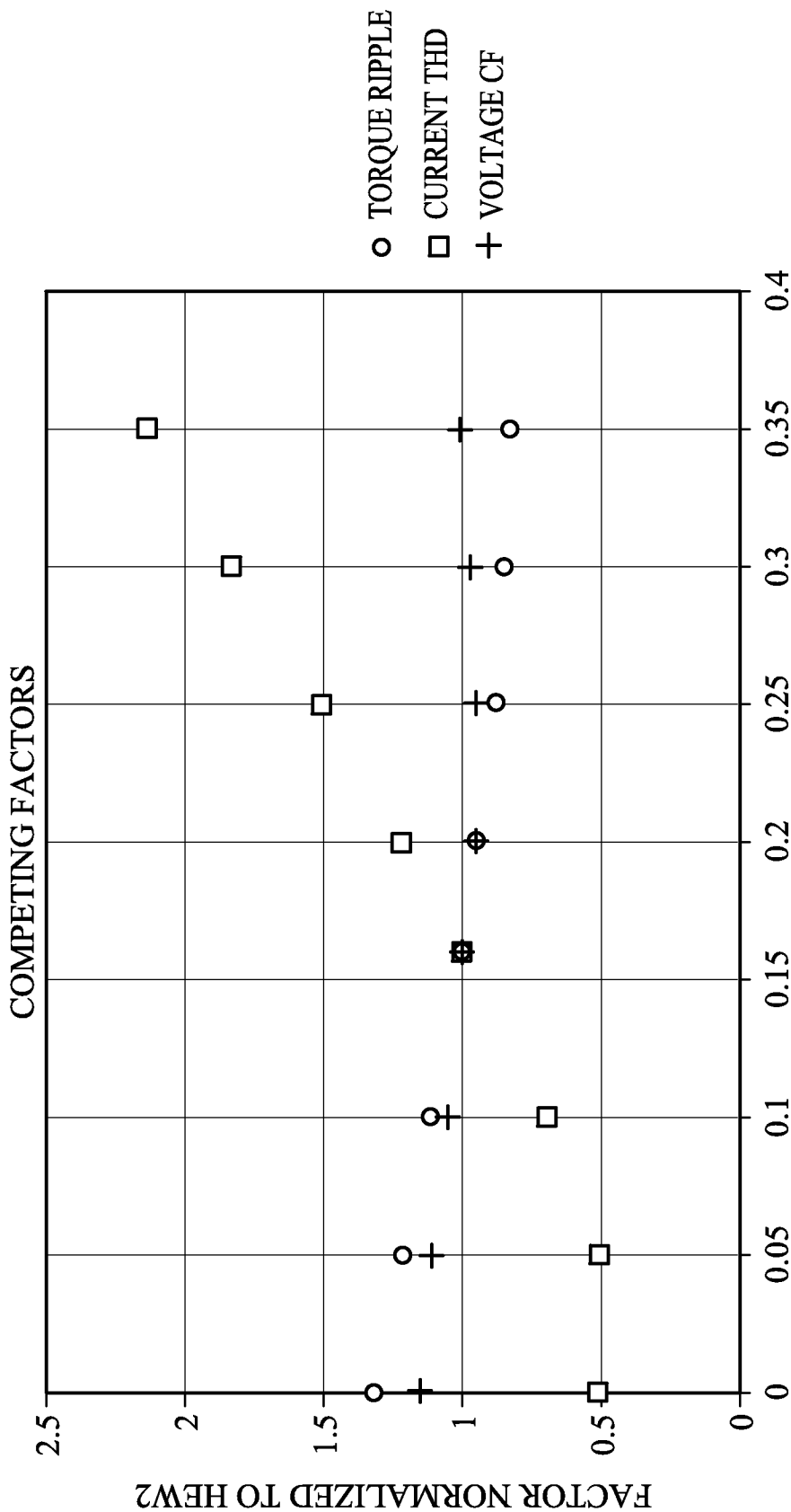
Figure 13:
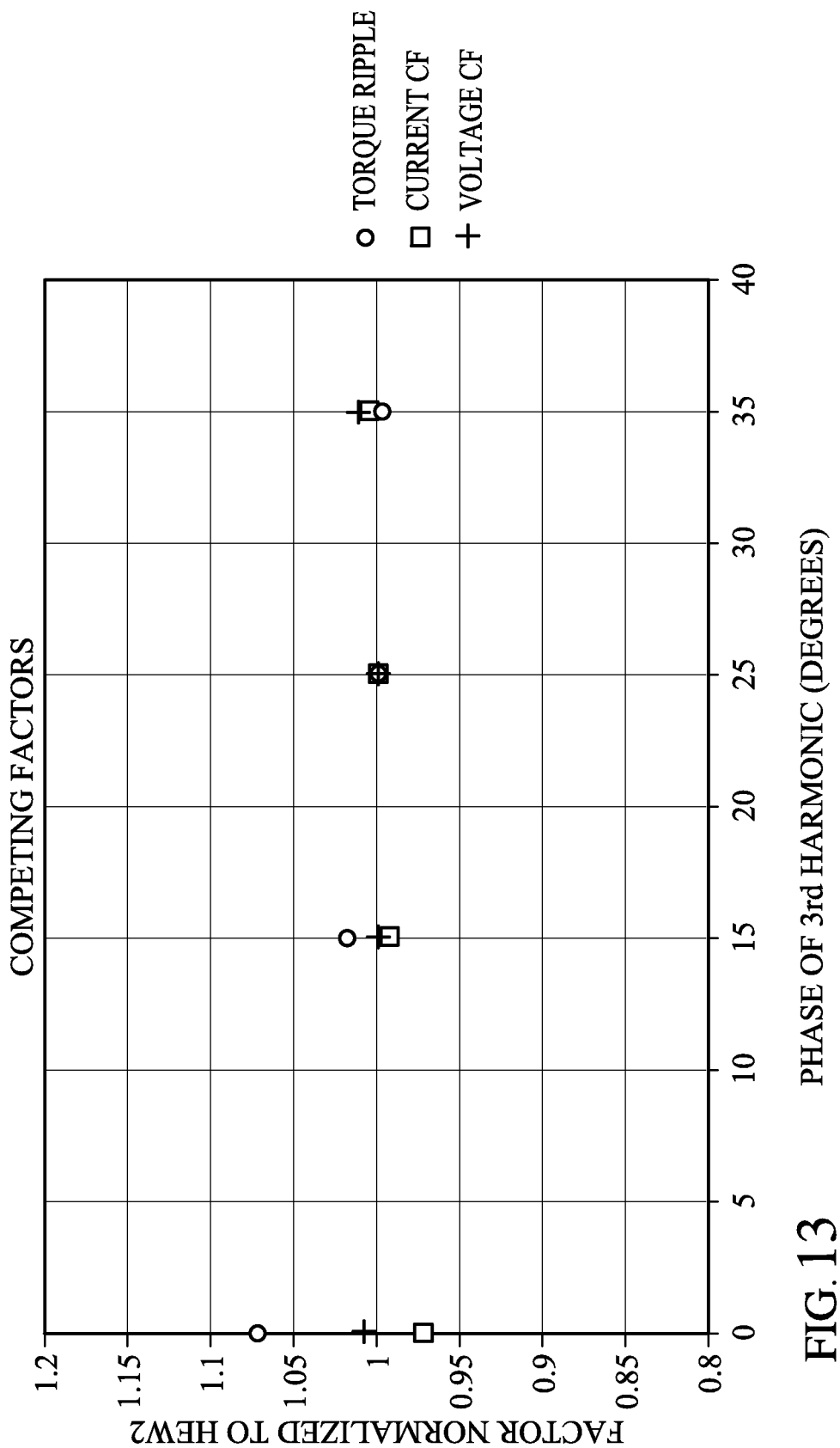

FIGS. 12 and 13 are graphs illustrating values of competing factors in the selection of harmonic component parameters. The values are normalized to hew2 voltage; therefore, the values of the selected factors, i.e. torque ripple, current THD and CF and voltage CF, have values equal to 1.0 at a $3^{rd}$ harmonic amplitude of 0.16 and the $3^{rd}$ harmonic phase of 25 degrees. FIG. 12 illustrates that normalized torque pulsation, or ripple, decreased gradually as the amplitude of the 3rd harmonic component increased from 0 to 0.35. However, normalized current THD increased rapidly from 0.5 to over 2.0. Consequently, the cost of reducing normalized torque pulsations below 1.0 becomes expensive due to the faster growth rate of normalized current THD. FIG. 13 illustrates that torque pulsations became less significant as phase increased, without significant current or voltage CF.

Figure 14:
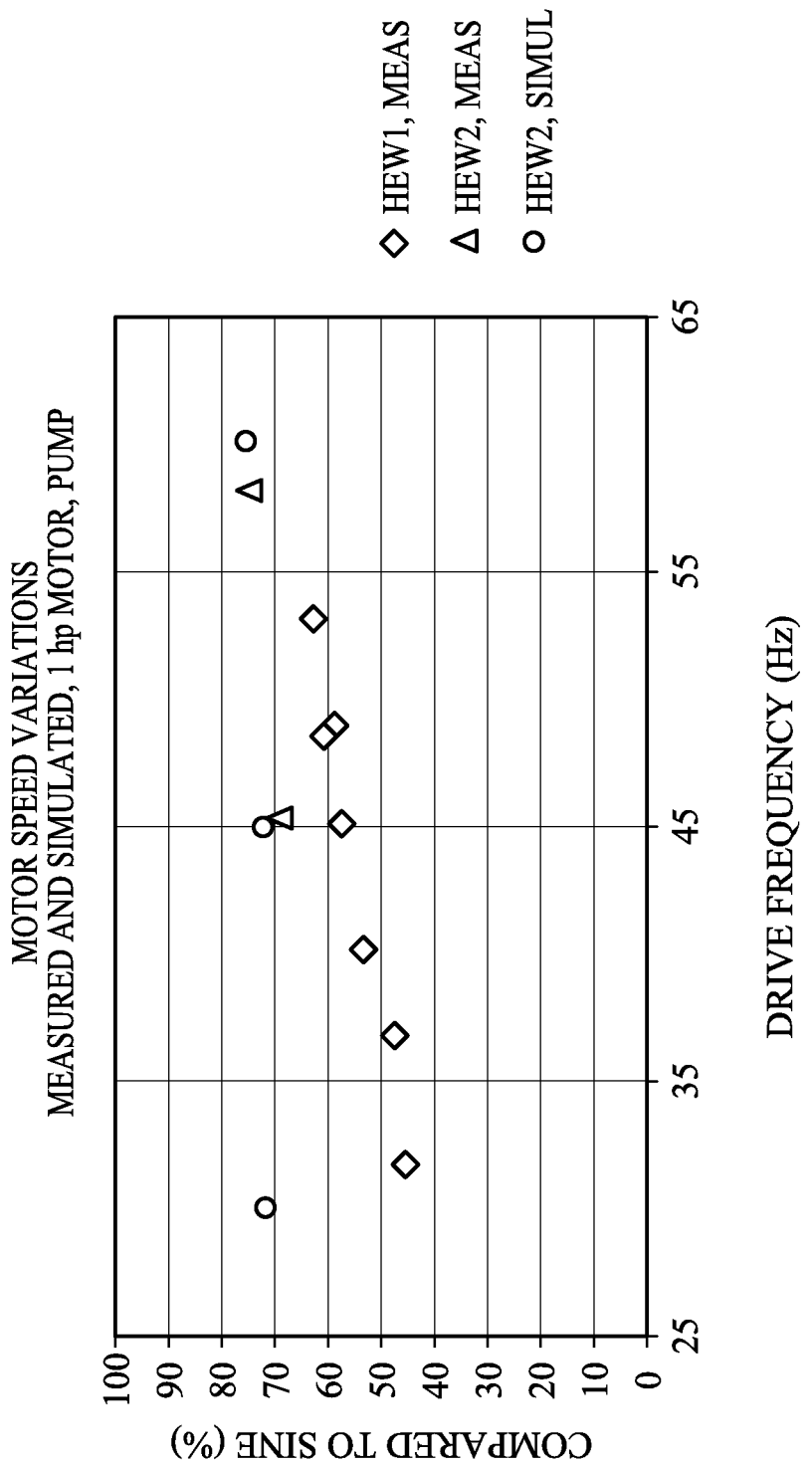
Figure 15:
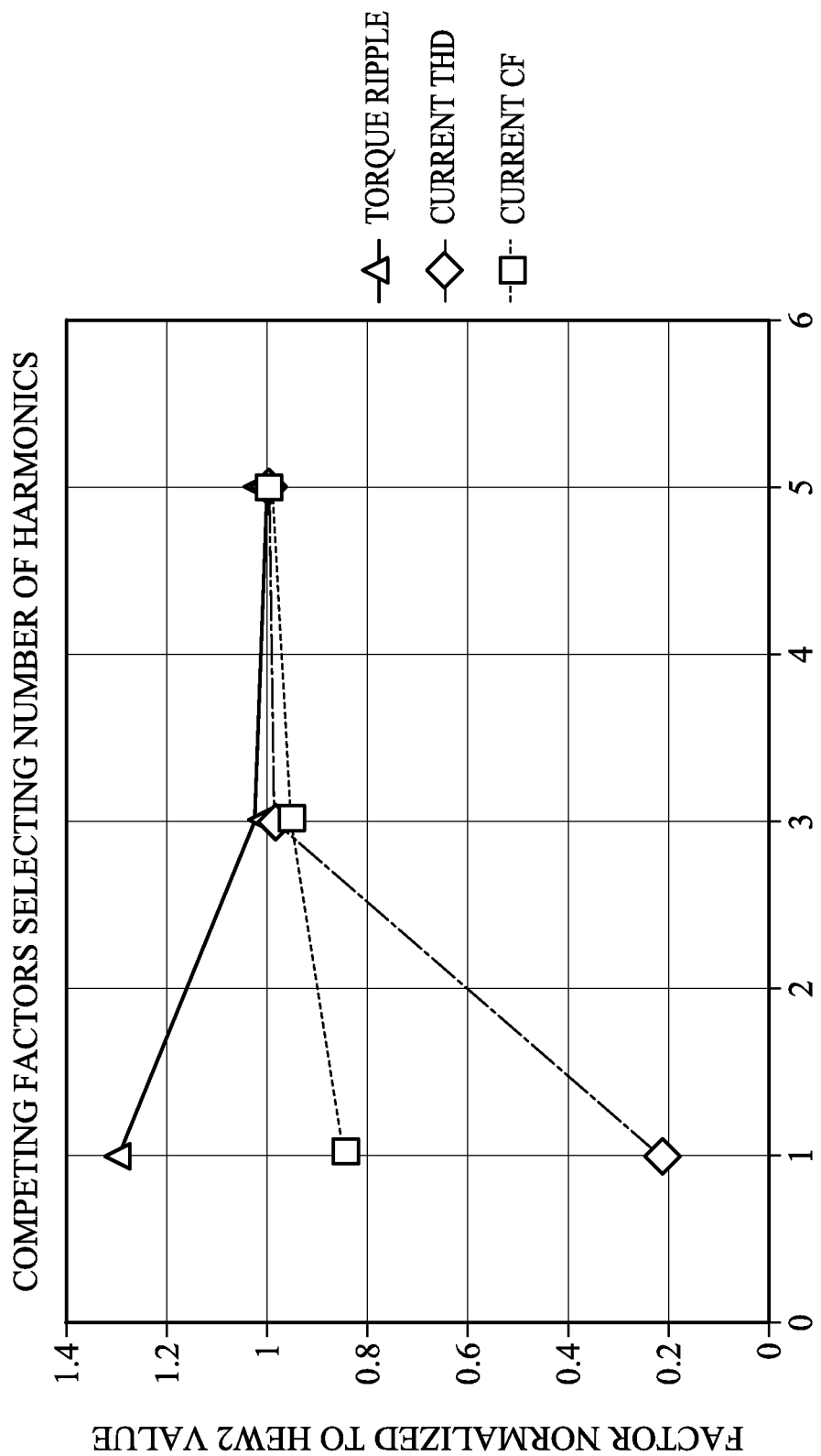

The operation of drive unit 100 and motor 32 was simulated to explore the effectiveness of various enhanced voltages. Simulated results were first compared to actual speed ripple measurements obtained with the hew1 look-up table in the test loop to validate the simulation. Speed ripple was calculated by comparing average speed to instantaneous speed. To calculate instantaneous speed, a toothed disk was coupled to the motor. The time required for each of the gaps defined by the teeth to pass before a sensor determined the instantaneous speed. FIG. 14 shows graphically that the simulation adequately predicted actual operation of drive unit 100 and motor 32 because measured and simulated hew2 values are substantially the same. The simulated hew1 values indicate that the hew1 voltage reduced speed ripple even more than the hew2 voltage. The hew1 speed ripple is at worse about 65% of the ripple of the sinusoidal waveform (at frequencies above 50 Hz), and at best about 48% (at frequencies below 35 Hz).

The operation of drive unit 100 and motor 32 was then simulated to evaluate the effect of the $5^{th}$ harmonic. FIG. 14 illustrates competing factors, normalized to hew2 values, for an enhanced voltage comprising only the third harmonic and described by hew3(t) in formula (3):

$$hew3(t)=\sin(\omega t)+0.16\sin(3\omega t+25°) \quad (3)$$

As shown in FIG. 14, the competing factors substantially converge on the $3^{rd}$ harmonic even without the addition of the $5^{th}$ harmonic. Thus, while the $5^{th}$ harmonic (included in hew2) further improves results, addition of the $3^{rd}$ harmonic alone yields valuable benefits.

Figure 16:
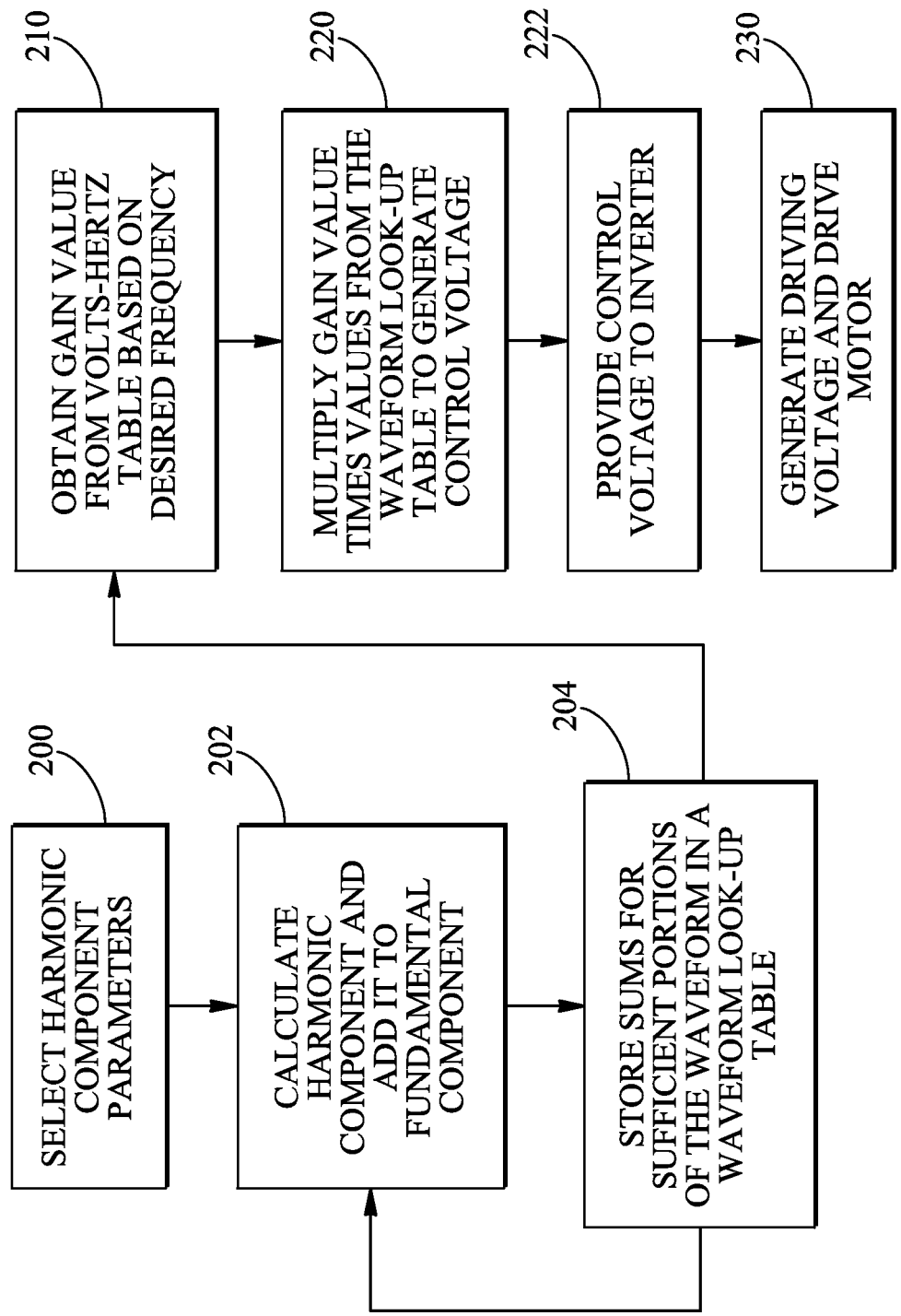
FIG. 16 is a block diagram of a method of driving a single phase motor according to another embodiment of the disclosure.

Referring now to FIG. 16, an embodiment according to the disclosure of a method of operating a fluid supply system is also provided herein. The method begins at 200 with the selection of harmonic component parameters including waveform, magnitude and phase angle. For example, as described previously, the hew1(t) harmonic component parameters include the sine waveform, third harmonic component magnitude (0.30) and phase angle (40°) and fifth harmonic component magnitude (0.20) and phase angle (50°). At 204 a harmonic component is configured with the selected parameters and added to a fundamental component of the control voltage. The calculation and sum is repeated for sufficient portions of the waveform to construct a full wave, e.g. ¼, ½ or all the portions. If a look-up table is used by the processing unit to generate the control voltage, at 206 the sums of the fundamental and harmonic components corresponding to a plurality of portions of the waveform are stored in the waveform look-up table. Otherwise the sums are provided to an arithmetic function. At 210, a voltage gain value is obtained from a volts-hertz look-up table according to a desired operating frequency. At 220, the gain value is multiplied by the sum corresponding to each portion of the waveform to produce the control voltage. The computation cycles through a multitude of times during each waveform cycle while the gain value only changes when the desired frequency changes. At 222 the control voltage is provided to an inverter where, at 230, a driving voltage is generated and provided to the motor.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A system for driving a load, the system comprising:
   a processing unit generating a control voltage $V_{hew}(t)$ from a fundamental sinusoidal component and a harmonic component, the harmonic component being odd numbered; and
   a pulse-width-modulation (PWM) controller receiving the control voltage $V_{hew}(t)$ and converting the control voltage $V_{hew}(t)$ to a driving voltage configured to drive a single phase motor, the driving voltage being a PWM voltage,
   wherein the control voltage $V_{hew}(t)$ is configured to maintain a voltage crest factor of the driving voltage at or below about 1.4 and a current crest factor of the driving voltage at or below about 1.9.

2. A system as in claim 1, wherein the fundamental component has a fundamental component magnitude and the harmonic component has a harmonic component magnitude which is smaller than the fundamental component magnitude.

3. A system as in claim 2, wherein the control voltage $V_{hew}(t)$ further includes a second harmonic component which has a second harmonic component magnitude that is smaller than the harmonic component magnitude, the second harmonic component being odd numbered and phase shifted relative to the harmonic component.

4. A system as in claim 1, wherein the control voltage $V_{hew}(t)$ has the form $V_{hew}(t)=f(\omega t)+A_i f(i\cdot\omega t+\theta_i)$, wherein i is an odd numbered integer, $A_i$ is the harmonic component magnitude and $\theta_i$ is a harmonic component phase shift greater than zero, wherein the harmonic component reduces torque pulsations of the motor.

5. A system as in claim 4, wherein the control voltage $V_{hew}(t)$ further includes a second harmonic component which has a second harmonic component magnitude that is smaller than the harmonic component magnitude, the second harmonic component being odd numbered and phase shifted relative to the harmonic component.

6. A system as in claim 5, wherein the control voltage $V_{hew}(t)$ has the form $V_{hew(t)}=f(\omega t)+A_3 f(3\cdot\omega t+\theta_3)+A_j f(j\cdot\omega t+\theta_j)$, wherein $A_3$ is the harmonic component magnitude and $\theta_3$ is the harmonic component phase shift; j is an odd numbered integer, $A_j$ is the second harmonic component magnitude and $\theta_j$ is a second harmonic component phase shift, and wherein $A_3 > A_j$ and $\theta_j > \theta_3$.

7. A system as in claim 6, wherein the functions $f(\omega t)$, $f(i\cdot\omega t+\theta_i)$ and $f(j\cdot\omega t+\theta_j)$ are selected from the group consisting of a sine function and a cosine function.

8. A system as in claim 1, wherein the control voltage $V_{hew}(t)$ is configured to reduce a performance characteristic of the motor by at least about 10%, the performance characteristic selected from the group consisting of a torque ripple and a speed ripple.

9. A system as in claim 1, wherein the single phase motor is adapted to drive a fluid pump to maintain a fluid pressure of a fluid therewith, wherein the control voltage $V_{hew}(t)$ reduces by at least about 10% a fluid pressure ripple of the fluid pressure.

10. A system as in claim 9, further including the single phase motor and the fluid pump.

11. A system as in claim 9, further including a skip frequency selection device operable to select a frequency, wherein the processing unit is programmed to prevent operation of the single phase motor at frequencies based on the selected frequency.

12. A system as in claim 11, wherein the selected frequency is selected based on a noise level of the system and is selected to abate the noise level.

13. A system as in claim 1, wherein the control voltage $V_{hew}(t)$ comprises mathematical equivalents of the expression $V_{hew}(t)=f(\omega t)+0.16\times f(3\cdot\omega t+25°)+0.1\times f(5\cdot\omega t+35°)$.

14. A method of operating a motor, the method including the steps of:
   generating a control voltage $V_{hew}(t)$ having the form $V_{hew}(t)=f(\omega t)+A_i f(i\cdot\omega t+\theta_i)$, wherein i is an odd numbered integer, $A_i$ is a harmonic component magnitude and $\theta_i$ is a harmonic component phase shift greater than zero;
   generating a driving voltage with a pulse-width-modulated (PWM) controller based on the control voltage $V_{hew}(t)$, wherein the control voltage $V_{hew}(t)$ is configured to maintain a voltage crest factor of the driving voltage at or below about 1.4 and a current crest factor of the driving voltage at or below about 1.9; and
   driving a single phase motor with the driving voltage to improve a performance characteristic of the motor.

15. A method of operating a motor as in claim 14, wherein the control voltage $V_{hew}(t)$ further includes a second harmonic component having a second harmonic component magnitude and a second harmonic component phase shift, the control voltage $V_{hew}(t)$ having the form $V_{hew(t)}=f(\omega t)+A_i f(i\cdot\omega t+\theta_i)+A_j f(j\cdot\omega t+\theta_j)$,
   wherein j is an odd numbered integer, $A_j$ is the second harmonic component magnitude and $\theta_j$ is the second harmonic component phase shift, and
   herein $A_i > A_j$ and $\theta_j > \theta_i$.

16. A method of operating a motor as in claim 14, wherein improving the performance characteristic includes reducing by at least about 10% at least one of a torque ripple and a speed ripple.

17. A method of operating a motor as in claim 16, further including driving a pump with the single phase motor to generate a fluid pressure, wherein improving the performance characteristic reduces a fluid pressure ripple of the fluid pressure by at least about 10%.

18. A method of operating a motor as in claim 14, wherein improving the performance characteristic includes reducing an acoustic noise related to the operation of the motor by at least about 10%.

19. A method of operating a motor as in claim 14, wherein the control voltage $V_{hew}(t)$ comprises mathematical equivalents of the expression $V_{hew}(t)=f(\omega t)+0.16\times f(3\cdot\omega t+25°)+0.1\times f(5\cdot\omega t+35°)$.

* * * * *